United States Patent
Nadarajah et al.

[11] Patent Number: 6,135,691
[45] Date of Patent: Oct. 24, 2000

[54] PROTECTIVE CAPS FOR BOLTS WITH NUTS

[75] Inventors: Nagendran Nadarajah; A. Rahim Mohd Nor, both of Kajang, Malaysia

[73] Assignees: Romilly International Ltd., Virgin Islands (Br.); Petronas Research and Scientific Services Sdn. Bhd., Malaysia

[21] Appl. No.: 09/117,763

[22] PCT Filed: Feb. 6, 1997

[86] PCT No.: PCT/SG97/00005

§ 371 Date: Feb. 1, 1999

§ 102(e) Date: Feb. 1, 1999

[87] PCT Pub. No.: WO97/29289

PCT Pub. Date: Aug. 14, 1997

[30] Foreign Application Priority Data

Feb. 9, 1996 [MY] Malaysia .......................... PL 9600482
Mar. 18, 1996 [MY] Malaysia .......................... PL 9600989

[51] Int. Cl.$^7$ ........................................ F16B 37/14
[52] U.S. Cl. ...................... 411/431; 411/428; 411/372.6; 411/377
[58] Field of Search ................... 411/428, 429, 411/431, 377, 373, 372.5, 372.6

[56] References Cited

U.S. PATENT DOCUMENTS

| | | | |
|---|---|---|---|
| 2,663,213 | 12/1953 | Davidson | 411/428 |
| 3,241,427 | 3/1966 | Bosler. | |
| 4,227,561 | 10/1980 | Molina. | |
| 4,295,766 | 10/1981 | Shaw. | |
| 4,400,123 | 8/1983 | Dunegan | 411/431 |
| 4,659,273 | 4/1987 | Dudley | 411/373 |
| 4,883,399 | 11/1989 | MacLean. | |
| 4,993,902 | 2/1991 | Hellon. | |
| 5,028,093 | 7/1991 | Nason. | |
| 5,071,300 | 12/1991 | McCauley | 411/429 |
| 5,082,409 | 1/1992 | Bias. | |

FOREIGN PATENT DOCUMENTS

| | | | |
|---|---|---|---|
| 153487 | 9/1985 | European Pat. Off. | 411/429 |
| 1 085 586 | 2/1956 | Germany. | |
| 34 09 947 | 9/1985 | Germany. | |
| 41 05 741 | 9/1992 | Germany. | |
| 636531 | 3/1962 | Italy | 411/377 |
| 2-102910 | 4/1990 | Japan | 411/377 |
| 3-69808 | 3/1991 | Japan | 411/377 |
| 8-145032 | 6/1996 | Japan. | |
| 559 861 | 3/1975 | Switzerland. | |
| 850856 | 10/1960 | United Kingdom. | |
| 948934 | 2/1964 | United Kingdom. | |
| 2 079 884 | 6/1981 | United Kingdom. | |
| 2 209 573 | 5/1989 | United Kingdom. | |
| WO 92/07198 | 4/1992 | WIPO. | |

*Primary Examiner*—Flemming Saether
*Attorney, Agent, or Firm*—Townsend and Townsend and Crew LLP

[57] ABSTRACT

The present invention is directed to a protective device for a nut and bolt assembly which assembly is used to secure two or more parts together. The invention a tubular shaft member to protect the bolt and a tubular shaft or hemispherical body to cover the nut or to cover the tubular shaft and nut together. The tubular shaft is either an independent unit or is integrally connected to the hemispherical body. In more embodiments a connecter unit is used. Grease or other protective agent is introduced into assembly to prevent rust and deterioration.

8 Claims, 7 Drawing Sheets

PROTECTIVE CAPS FOR BOLTS WITH NUTS

FIELD OF THE INVENTION

The present invention relates to protective caps for bolts with nuts and in particular relates to protective caps for bolts with nuts protruding from a surface against damaging effects such as corrosion from the surrounding environment.

BACKGROUND OF THE INVENTION

There are many situations where nut and bolt systems of securing are adopted. For example removably securing two pieces of metal objects, valve and flange systems, mounting metal structures onto a receiving base or foundation, machinery parts, etc. usually involve the adoption of a nut and bolt system for securing two or more parts. Such bolt and nut assembly combination is often exposed to deterioration enhancing agents such as water, salt water, acids, alkali and other chemicals present in the ambience. The external effects as aforesaid, such as corrosion, rust, built up of deposits etc. reduce the advantage of such nut and bolt securing system. Nut and bolt systems subjected to prolonged environmental forces are difficult to dissemble. To separate the parts secured together, would then often necessitate expensive time consuming procedures like using of cutting torches, hack saws, etc. Such destructive removal procedures are unproductive and expensive.

To overcome such disadvantages, various methods and/or products have been introduced. One such product used is protective cap. One such protective cap is described in Norwegian Patent No. 157152 and in PCT publication-international application number 8400033. Currently available protective caps are produced for each dimension of nut and bolt, thus making such caps relatively expensive Thus it is an object of the present invention to provide universal nut and bolt protective caps for predetermined range of nut and bolts.

SUMMARY OF THE INVENTION

A protective device for bolt and nut assembly used to secure structures together comprising of a tubular cap closed at one end and open at the other end, the said open end being broader than the closed end and the device includes an intermediate connector nut with an upright shaft portion threaded on the inside surface and a flange portion at the base of the shaft portion wherein the an intermediate connector nut is introduced onto the bolt portion to provide a tight fit and the tubular cap is introduced over the exposed part of the bolt.

In another aspect the invention includes a substantially hemispherical body, with a housing chamber to accommodate a connector nut, the connector nut with a central aperture to receive a bolt and wherein the connector nut is introduceable into the housing chamber which sub-assembly is the secured onto the bolt and nut assembly.

Yet in another aspect the invention includes a two part device, comprising of a skirt part dimensioned and configured to fit over the nut and integral with first tubular shaft portion and a second tubular shaft portion open at one end and closed at the other end wherein the skirt part is fitted over the nut and bolt assembly and the second tubular shaft portion is fitted over the skirt part in a tight fitting manner.

The invention also includes a tubular shaft member closed at one end and open at the other end and screw threaded to fit over the bolt and a shaft and skirt member integrally connected wherein the shaft and skirt member is telescopically fitted over the tubular shaft member and wherein in a fitted position the skirt portion of the shaft and skirt member extends over the nut.

In another aspect the invention includes a substantially hemispherical body with a tubular member extending downwards from the upper part of the inside ceiling of the said hemispherical body wherein in a fitted position, the tubular member is secured over the bolt and the hemispherical body covers the nut.

Yet in another aspect the invention includes a tubular cap closed at one end and open at the other end, the said open end being broader than the closed end; the closed end of the tubular cap includes a one way valve means and the open end is dimensioned and configured to fit over the nut in a tight fitting manner.

BRIEF DESCRIPTION OF THE DRAWINGS

Further objects, features and advantages of the present invention will become apparent upon consideration of the detailed description of the presently preferred embodiments, when taken in consideration with the accompanying drawings, wherein.

Throughout the drawings the same numerical legends are used to identify the same parts.

Figure 1:
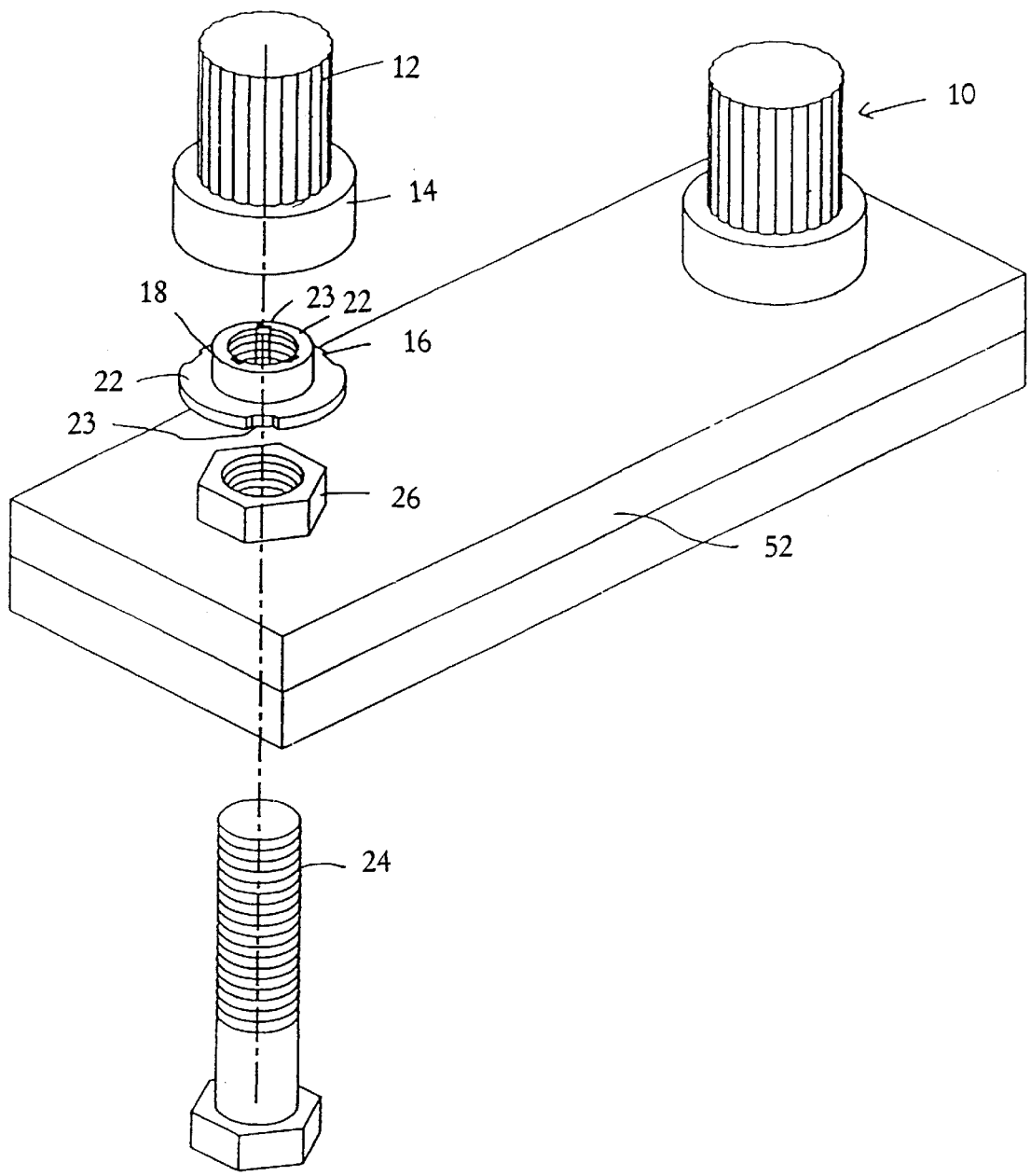
FIG. 1 shows a protective cap and nut and bolt in assembly sequence and a mounted cap.
Figure 2:
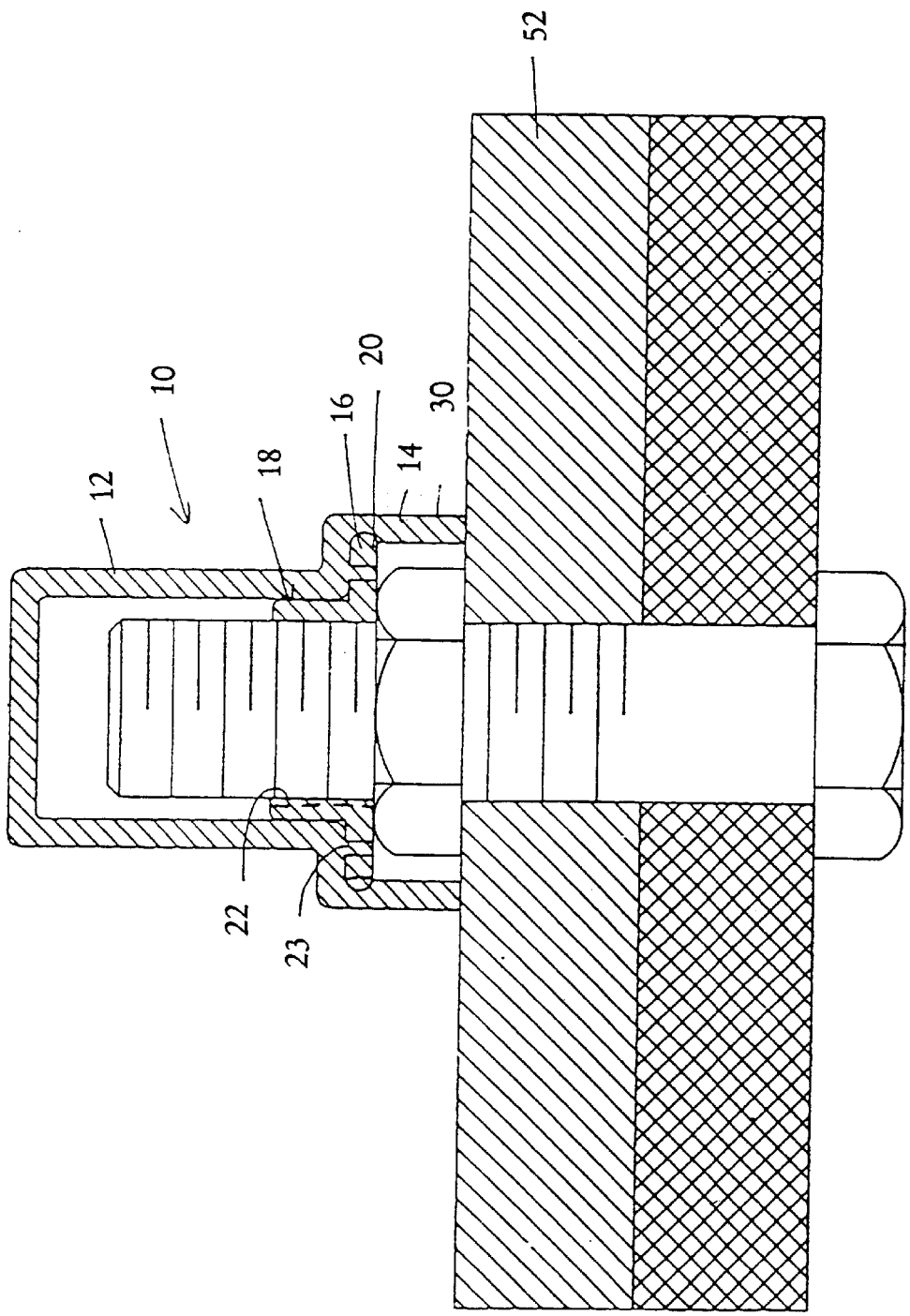
FIG. 2 is a cross-sectional view of a mounted protective cap over a nut and bolt assembly

In the embodiments shown in the FIGS. 1 and 2, the protective cap (10) consists of a cylindrical shaft (12) closed at one end and open ended at the opposite end and terminating in a skirt (14). The cap further includes an intermediate connector nut (16). The intermediate connector nut (16) comprises of a internally threaded cylindrical shaft portion (18) and a flange portion (20) integrally connected to the said shaft portion. The flange portion (20) includes at least one cut out edge (23) along the peripheral edge of the flange portion. At least one longitudinal groove (22) is provided on the interior of the shaft portion of the connector nut. The groove (22) in the connector nut and the cut out edge (23) allow excess grease to flow through to the nut.

The method of use of the protective cap and other features of this embodiment will be described now. The intermediate connector nut (16) is screwed onto the protruding bolt (24) until it is tightly in portion above the nut (26). The cap (10) is filled with grease or other protective agent. The cap is then mounted over the intermediate connector nut. The side walls (30) of the skirt (14) are configured and dimensioned to cover the nut (26); the edges of the skirt to be in contact with the surface on which the nut (26) is placed.

It will be observed that internal diameter of the shaft portion (12) of the cap is marginally larger that the external diameter of the shaft portion (18) of the intermediate connector nut (16). The height of the shaft portion (12) of the cap is such it extends above the length of the protruding bolt (24). Standard sized caps (10) and intermediate connector nuts (16) can be produced in different size ranges to cater for different sizes of nuts and bolts. For a given sized nut and bolt protective caps with fixed diameter of skirts (14) but varied lengths of shaft portions (12) can be produced. In addition, intermediate connector nuts of standard thread sizes can be produced to provide different thread sizes of the bolts.

Figure 3:
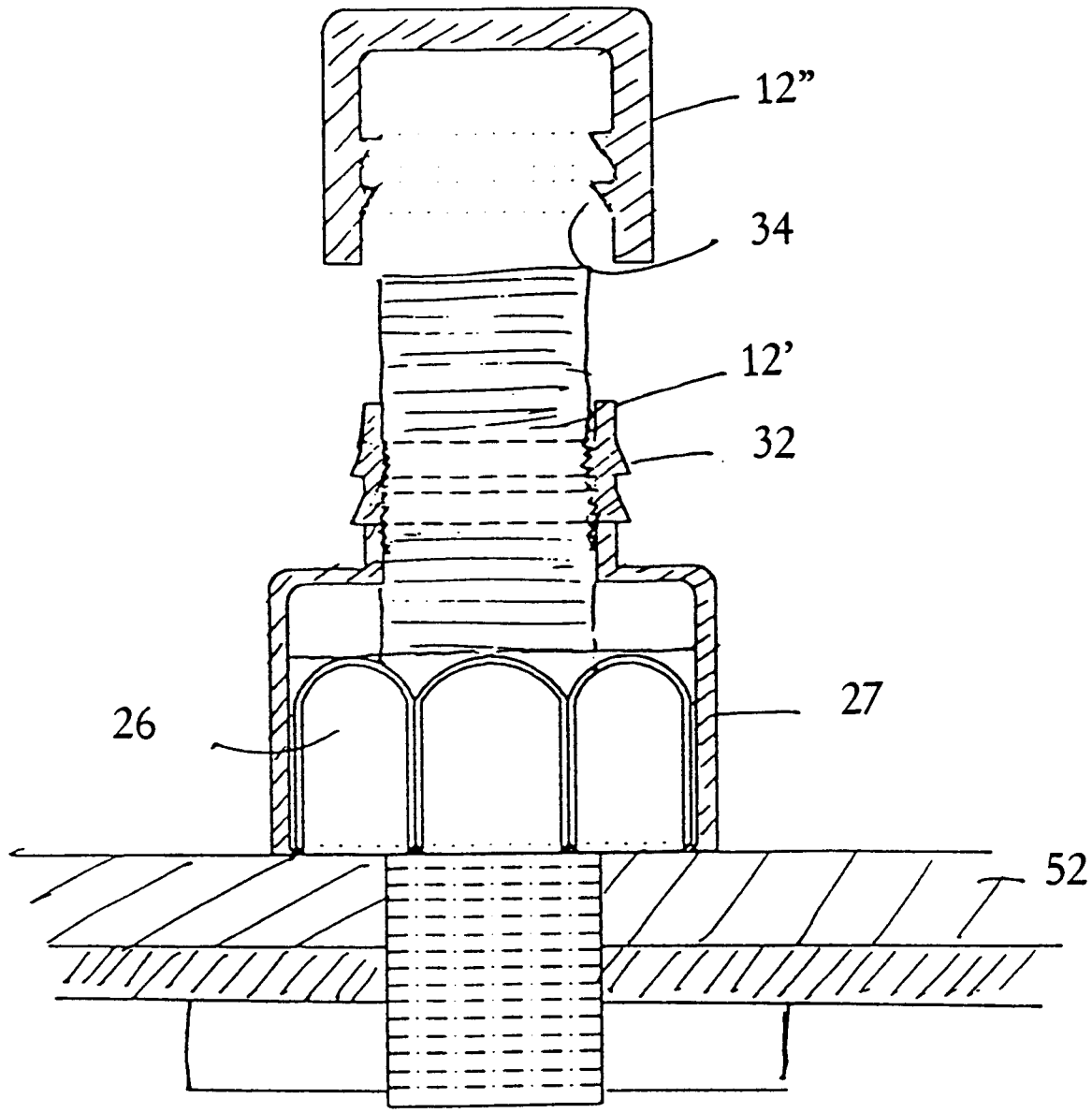
FIG. 3 shows another embodiment of a protective cap in two portions, a base portion and a shaft portion.

Another embodiment of a protective cap is illustrated in FIG. 3. The shaft portion (12) of the cap comprises of two separate cylindrical or tubular portions. The external side of the first shaft portion (12') includes at least one ring of downwardly producing lips (32) The internal side of the shaft is threaded to be screwed onto the bolt (24). A longitudinal groove (25) is present on the internal side of the shaft to allow the flow of grease or other protective agent over the bolt (24). One end of the first shaft portion terminates in a broad tubular skirt port (27) configured to cover and extend over the nut (26). The second portion of the shaft (12") is dimensioned and configured to tightly fit over the first shaft portion of the cap. The interior side of the second portion (12") of the cap includes at least one pair of rings or upwardly pointing circular barbs (34). The second shaft portion (12") is snap fastenable over the first portion (12') of shaft. The first portion is dimensioned to tightly fit over the nut (26). Grease or other protective agent is applied onto the exposed part of the nut and the bolt (24). The first portion is fitted over the nut. Grease or other protective agent is introduced into the second shaft portion (12") which is then fitted over the first portion of cap. It will be appreciated that the length of the second shaft portions can be varied to accommodate different lengths of bolts extending beyond the nut.

It will be appreciated that the protective cover, bolt cap, nut cap, and all parts exposed to the weather are preferably made of plastics material. The material should preferably be ultra violet resistant plastics with the following additional properties, high impact strength, durable and stable over extreme ambient temperatures.

Figure 4:
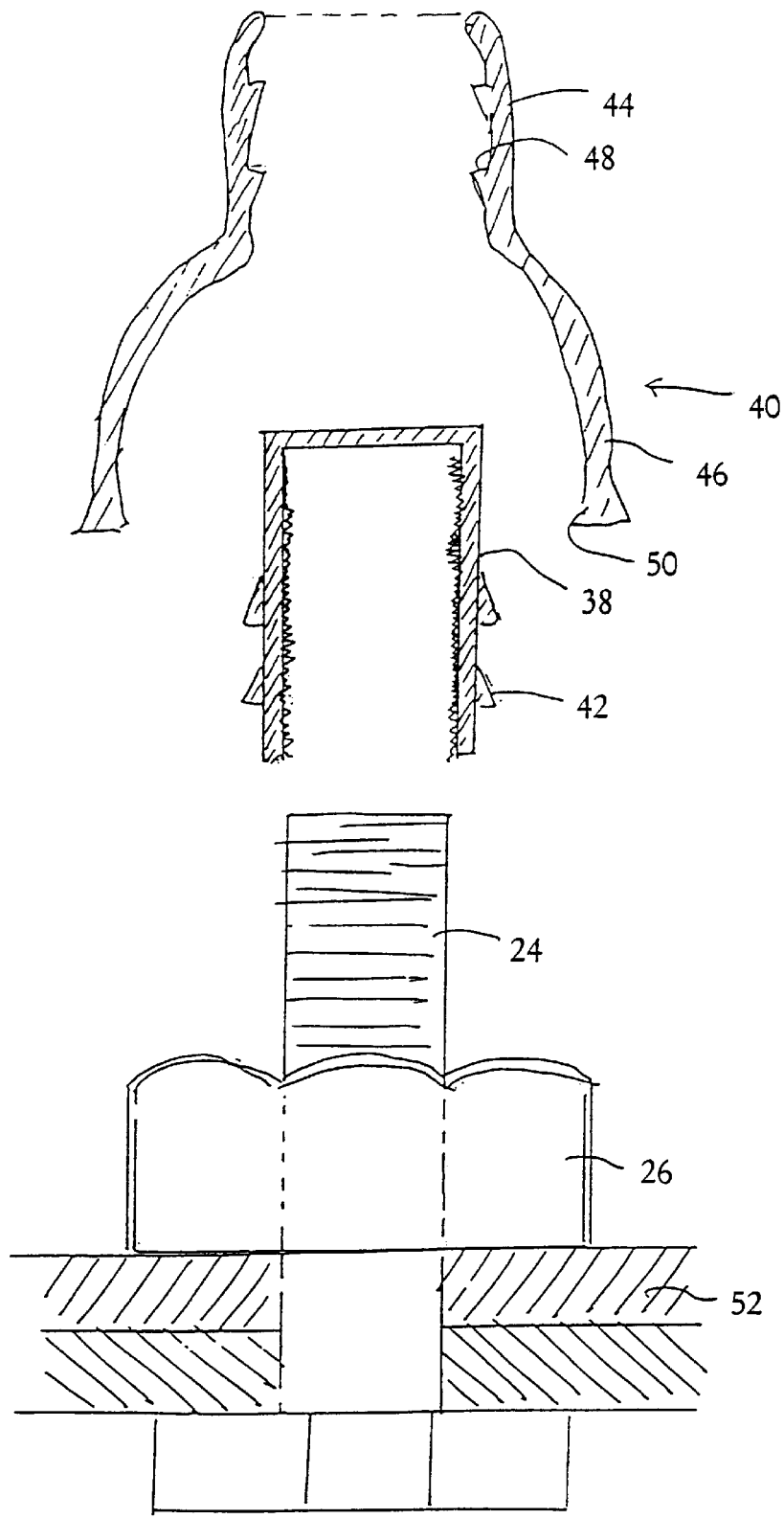
FIG. 4 shows yet another embodiment of a protective cap in two telescopically engageable protective caps.

FIG. 4 shows another embodiment of the invention, in two parts. The first part includes a includes a bolt cap (38) and the second part includes a nut cap (40). The bolt cap (38) is a tubular member with an open end and a closed end. The internal side of the bolt cap is threaded, and the external side includes at least one circular lip or rings. (42) and the cap is configured to fit tightly over the bolt. The nut cap (40) consists of a shaft portion (44) and a skirt portion (46) integrally connected. The shaft portion (44) includes at least a pair of lips (48) or rings designed and configured to fit cooperatively with the lips (42) of the bolt cap, when the shaft portion is fitted over the bolt cap. The skirt portion (46) of the bolt cap extends from the base of the shaft portion and is dimensioned to extend over the nut (26). In usage of this embodiment, the bolt can (38) is fitted over the exposed part of the bolt (24). Preferably grease or other protective agent is introduced into the chambers of the bolt cap, to provide for extended period of protection against the bolt (24). The exposed surface of the nut (26) is preferably coated with grease or other protective agent. Preferably the skirt portion (46) is partially filled with grease or other protective agent and is fitted over the nut (26) and the bolt cap (38). It will be appreciated that the closed end of the bolt cap may extend beyond the open end of the nut cap (40). The length of the bolt-cap (38) can be varied and of pre-determined lengths. The base of the skirt portion (46) of the nut cap includes a radially inward directioned lip (50) dimensioned and configured to fit tightly over the contact surface between the nut and the floor, (52).

Figure 5:
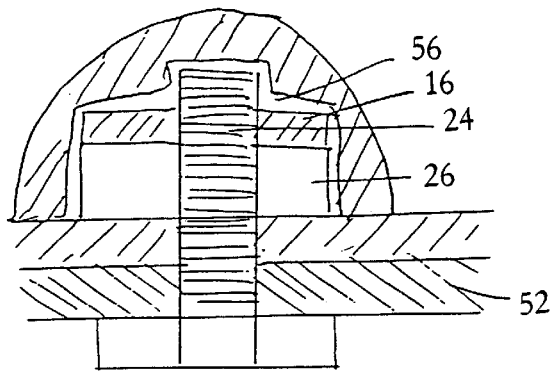
FIG. 5 shows a sectional view of another embodiment of a protective cap mounted over a nut and bolt assembly.
Figure 6:
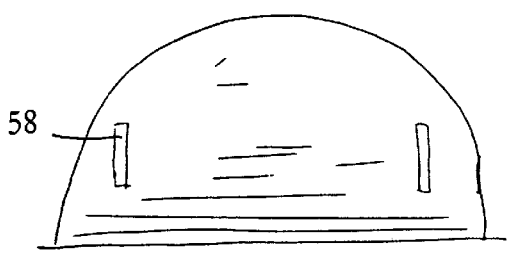
FIG. 6 shows the perspective external view of the protective.

FIG. 5 illustrates another embodiment of the invention. The protective cover includes a dome-shaped cover (54) to operate cooperatively with a self-locking connector nut (16). The connector nut (16) is fittable into a housing chamber (56) within the cover (54). The method of use of the cover and the connector unit and other features of the embodiment will be described now. Some grease or other protective agent is introduced into housing chamber (56) of the cover (54). The self-locking connector unit is fitted into the housing chamber. The external diametrical lengths of the connector unit (57) is marginally larger than the diametrical lengths of the housing chamber, such that the self-locking connector unit is held in a tight manner within the housing chamber. The cover and the connector unit assembly is now introduced over the protruding bolt (24) and screwed down. The cover includes at least a pair of slits (58) which slits are not linked to the housing chamber, to ensure external elements such as air or water is not introducible into the housing chamber or the internal sides of the cover (54). To remove the cover from the nut and bolt assembly, a pair of thongs is introduced into the slits (58) and the cover is then levered out forcibly. The connector nut is then screwed out using conventional tools.

Alternatively, the self-locking connector nut (57) is screwed onto the bolt (24). Grease or other protective agent is applied onto the exposed bolt and nut. The cover (54) is then snap fastened over the connector nut (57). It will be appreciated that the external configuration of the dome-shaped cover does not easily land itself to vandalism of the cover. Specially adapted thongs (not shown) are required to prise open the dome shaped cover.

Figure 7:
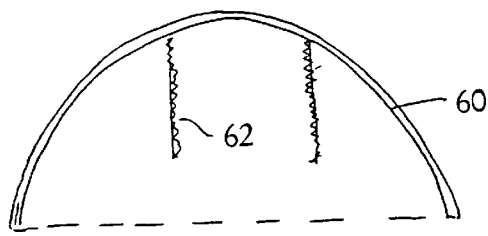
FIG. 7 illustrates another embodiment of a protective nut and cap in cross section.
Figure 9:
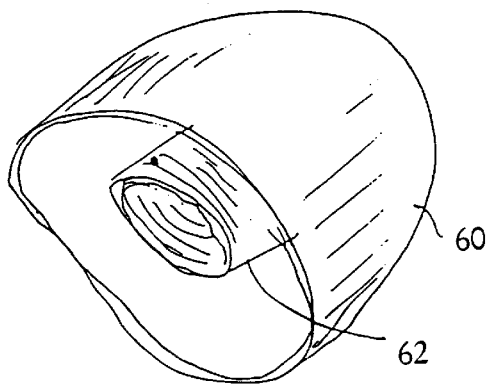
FIG. 9 shows a sectional view of the cap assembled over a nut and bolt.
Figure 8:
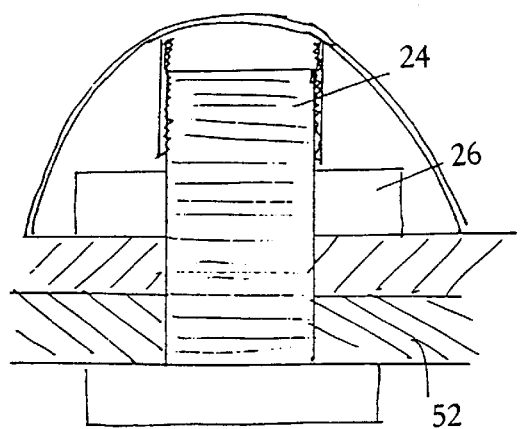
FIG. 8 shows a bottom perspective view of the embodiment shown in FIG. 7

Referring to FIGS. 7 to 9, there is illustrated yet another embodiment. The protective cover (60) consists of a hemispherical or dome shaped body with a tubular or cylindrical member (62) extending downwards from the upper part of the inside ceiling of the body. The internal side of the tubular member (62) is threaded. A longitidual groove or alternatively a passageway is provided along the length of the threaded portion of the tubular member to provide for the flow of grease or protective agent along the bolt (24). In use, grease or other protective cover, and the cover is then screw fastened over the bolt and nut assembly (see FIG. 8). Alternatively protective agent can be applied over the nut and bolt assembly and thereafter the cover is screw fastened over it.

The spatial dimensions of the cover (60) will be determined by the size of the nut (26) and bolt (24). A given sized cover can accommodate a range of lengths of the protruding bolt and a range of nut sizes.

Figure 11:
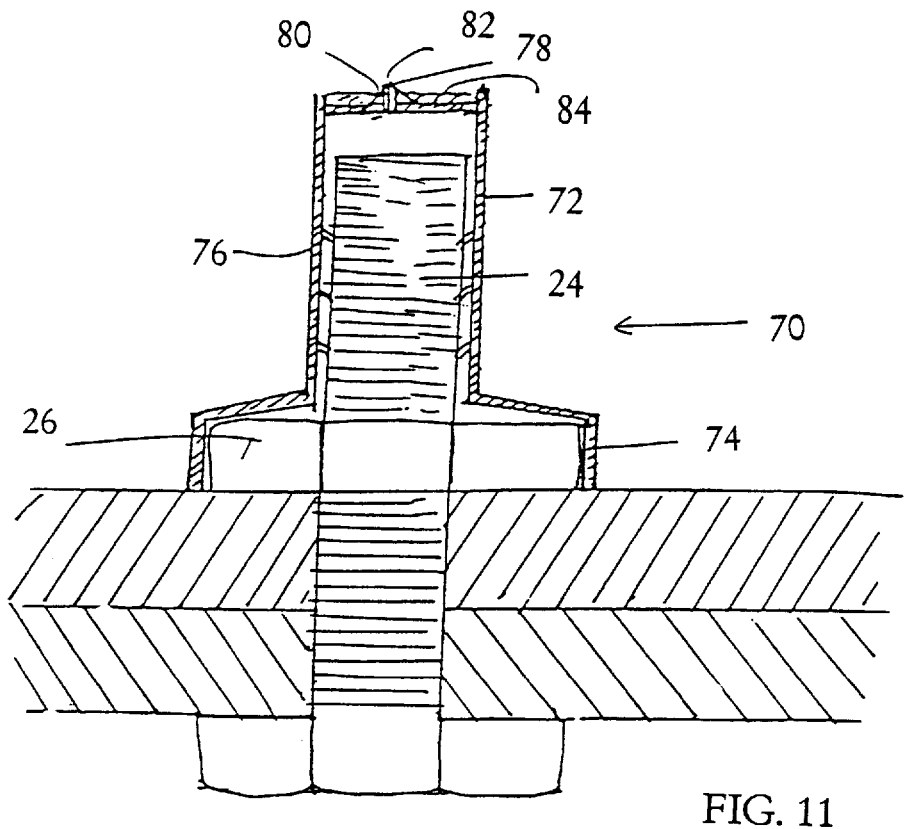
FIG. 11 shows a cross-sectional view of protective cap nut and bolt wherein the one end of the protect cap includes a valve.
Figure 12:
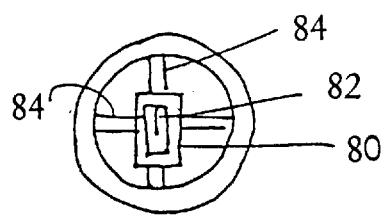
FIG. 12 shows a plan view of closed end of the protective cap shown in FIG. 10.
Figure 10:
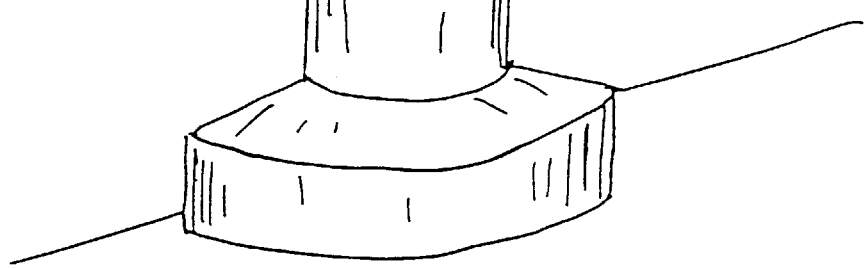
FIG. 10 shows a perspective view of another protective cap and nut.

Referring to FIGS. 10 to 12, there is illustrated yet another embodiment of a protective cap. The protective cap shown generally by the numeral (70) includes a tubular shaft member (72) and a skirt member (74) integrally connected to one end of the tubular shaft member. The skirt member is dimensioned and configured to fit tightly over a nut (26). The internal sides of the tubular shaft member (72) includes at least one annular ring or fin (76) to provide a gripping means along the bolt (24). One, end of the tubular shaft member includes a one way valve means (78). The one way valve means (78) comprises of a mound (80) with a thin slit (82) on top of the mound. To provide effective sealing means for the valve, the mound (80) is supported by a plurality of ridges (84) connecting the mound and the side walls of the tubular shaft.

Figure 13:
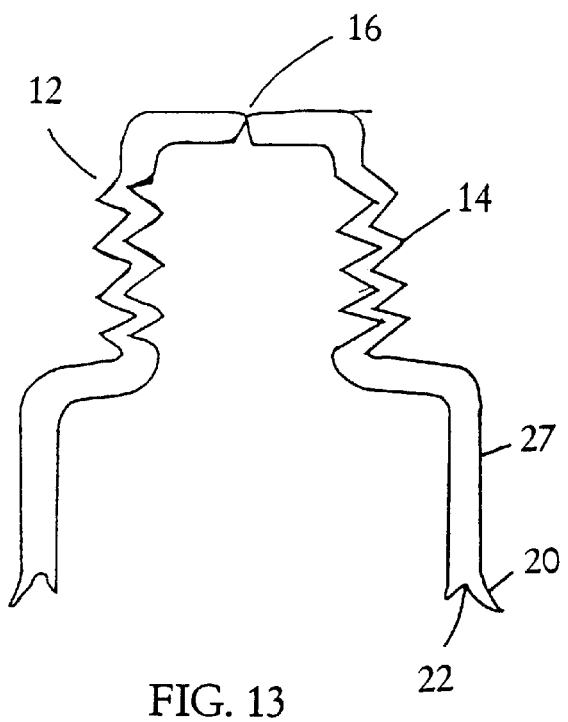
FIG. 13 shows a cross-sectional view of a protective cap and nut, with extendable shaft portion

Another embodiment of a protective cap is illustrated in FIG. 13. The shaft portion (12) of the cap comprises of an extendable portion (14) and a one way valve (16) preferably at the upper portion. The one-way valve (16) allows the expulsion of gaseous and fluid matter from within the cap, but at the same time prevents external matter from being introduced into the cap. The extendable portion of the cap, preferably consist of zig-zag collapsible tube integral with the rest of the cap but and without any apertures or punctures along the surface. This embodiment of the cap facilitated the use the cap in nuts and bolts where the diameter of the nut and bolt is constant but the length of the exposed nut is variable. In this matter standard cap of predetermined diameter can be conveniently fitted over exposed nuts of varying lengths.

Figure 14:
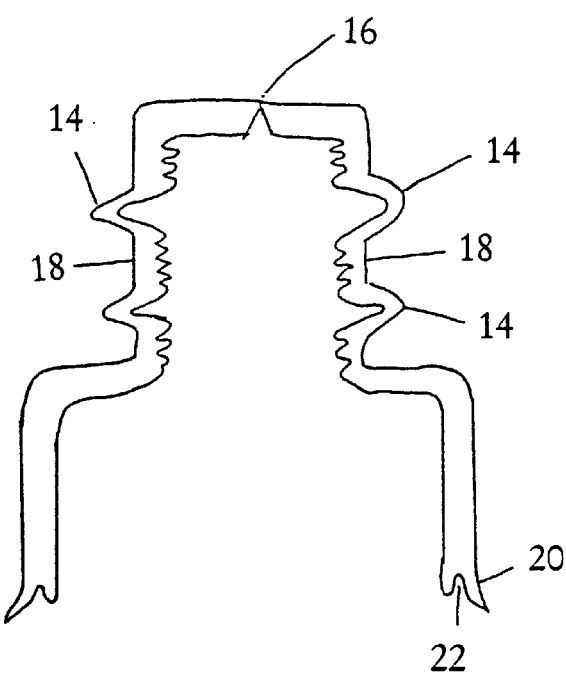
FIG. 14 shows a cross-sectional view of another protective cap and nut with extendable shaft portion

FIG. 14 shows a variation of the cap shown in FIG. 14. The shaft portion of the cap comprises of extendable portions (14) and non extendable portions (18) between two adjacent extendable portions. Preferably the non-extendable portions of the cap includes at the inside surface thereof, circumferential grooves. The circumferential grooves on the cap, permit closed and tight fir of the cap over the threaded portion of the exposed part of the bolt. At least one-way valve (16) is provided on the upper surface of the cap.

Figure 15:
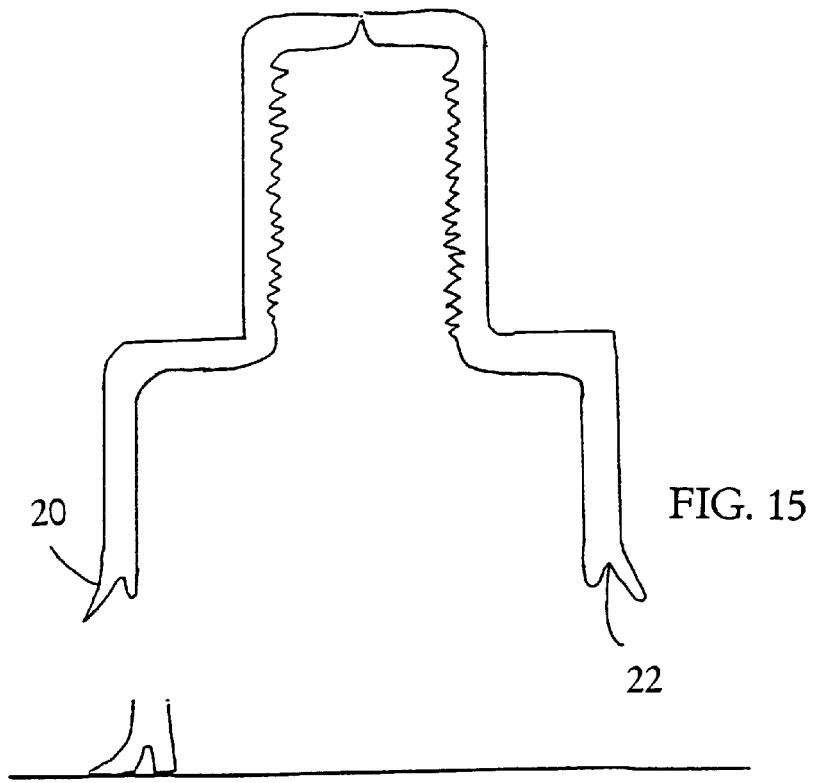
FIG. 15 shows a cross-sectional view of a protective cap and nut with a one-way valve at the top portion and annular grooves on the inside of the shaft portion.

In another embodiment of the invention as shown in FIG. 15 the shaft portion of the cap, includes at the inner surface, a grooved portion. A one-way valve (16) is provided for, preferably at the upper surface of the cap. The cap is fitted over the nut and bolt as described before.

In all the embodiments described here, the tubular skirt part includes at the terminal end flexible flange (20) and a groove (22). The groove (22) is adapted to receive grease or other anti-corrosive agent which is a liquid or semi liquid form. When the cap is fitted over the nut and bolt, in a tight fitting manner, the flexible flange extends over the contact surface (52) between the nut and the floor to prove a secure contact over the surface. This configuration further prevents the introduction of moist, water, air or other external matter onto the inside of the cap region.

At least, one way valve can be advantageously provided on the upper surface of the caps, shown in the other embodiments in this description. The provision of one way valves on the cap, allows the expulsion of atmospheric air and/or fluids remaining on the nut and bolt and prevents introduction of external atmospheric air or liquid into the cap after is it fitted over the nut and bolt.

The use of this embodiment will be described now. Protective agents of grease is applied onto the nut and bolt. If preferred same protective agent or grease can be introduced into the protective cap. The cap is then introduced over the bolt (24) and pushed over the nut and bolt until the skirt (74) fits tightly over the nut (26). Excess grease and. Or air is pushed out through the one-way valve (82). Alternatively the air can be extracted out to provide a near vacuum seal or low pressure air seal. The annular ribs or fins (76) fit tightly around air seal. The annular ribs or fins (76) fit tightly around the bolt, providing resistance when the cap is pulled out of the nut and bolt assembly. The protective cap is preferably made up of rubber or plastics material suitably treated to withstand the protective agents and the elements in the ambience.

A latitude of modification, change and substitution is intended in the foregoing disclosure, and in some instances, some features of the invention will be employed without a corresponding use of other features. Accordingly, it is appropriate that the appended claims be construed broadly are in a manner consistent with the spirit and scope of the invention herein.

What is claimed is:

1. A protective device comprising: a tubular cap closed at one end and open at another end said open end being broader than the closed end wherein:

the closed end of the tubular cap includes a one-way valve to allow the expulsion of materials from within the tubular cap to the outside and to prevent entry of materials from the outside into the tubular cap and the open end of the tubular cap is adapted to fit over a nut in a tight fitting manner.

2. The protective device as claimed in claim 1, wherein said one-way valve comprises a mound with a thin slit on the top of said mound, said mound being supported by a plurality of ridges connecting said mound and side walls of said tubular cap.

3. A protective device comprising: a tubular cap closed at one end and open another end, said open end being broader than the closed end wherein the tubular cap comprises an extendible shaft portion consisting of a zigzag collapsible region in the shaft portion;

a one way value in the shaft portion; and a skirt part adapted to fit over a nut and integral with the extendible shaft portion, wherein the skirt part is fitted over the nut and the extendible shaft portion encapsulates a bolt.

4. A protective device comprising: a tubular cap closed at one end and open at another end, said open end being broader than the closed end wherein the tubular cap comprises a shaft portion whose internal circumferential face contains grooves;

a one way value in the shaft portion; and a skirt part adapted to fit over a nut and integral with the shaft portion, wherein the skirt part is fitted over the nut and the shaft portion encapsulates a bolt.

5. The protective device as claimed in claim 4 wherein the shaft portion contains annular grooves on the internal circumferential face.

6. The protective device as claimed in claim 4 wherein said grooves are annular.

7. The protective device as claimed in claim 4, wherein said one-way valve is arranged to permit flow therethrough out of said tubular cap and to prevent flow therethrough into said tubular cap.

8. The protective device as claimed in claim 4, wherein said shaft portion is an extendible shaft portion.

* * * * *